US012597674B2

(12) United States Patent (10) Patent No.: US 12,597,674 B2
Lim (45) Date of Patent: Apr. 7, 2026

(54) CONNECTOR ASSEMBLY AND BATTERY MODULE

(71) Applicant: SK On Co., Ltd., Seoul (KR)

(72) Inventor: Ji Hoon Lim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 602 days.

(21) Appl. No.: 18/073,316

(22) Filed: Dec. 1, 2022

(65) Prior Publication Data

US 2023/0178838 A1 Jun. 8, 2023

(30) Foreign Application Priority Data

Dec. 3, 2021 (KR) ........................ 10-2021-0172179

(51) Int. Cl.
| | |
|---|---|
| *H01M 50/296* | (2021.01) |
| *H01M 50/204* | (2021.01) |
| *H01M 50/271* | (2021.01) |
| *H01M 50/342* | (2021.01) |
| *H01M 50/507* | (2021.01) |
| *H01R 13/52* | (2006.01) |

(52) U.S. Cl.
CPC ....... *H01M 50/296* (2021.01); *H01M 50/204* (2021.01); *H01M 50/271* (2021.01); *H01M 50/3425* (2021.01); *H01M 50/507* (2021.01); *H01R 13/521* (2013.01); *H01R 13/5213* (2013.01); *H01R 13/5216* (2013.01); *H01M 2200/20* (2013.01)

(58) Field of Classification Search
CPC ............. H01M 50/296; H01M 50/507; H01M 50/3425; H01M 50/204
See application file for complete search history.

(56) References Cited

U.S. PATENT DOCUMENTS

2010/0266878 A1* 10/2010 Eilertsen ................ H01G 9/008
429/186
2011/0054561 A1* 3/2011 Visco .................. H01M 4/5825
607/2

(Continued)

FOREIGN PATENT DOCUMENTS

| EP | 3836246 A1 | 6/2021 |
|---|---|---|
| JP | 06085116 A | 3/1994 |
| JP | 2018116768 A | 7/2018 |

(Continued)

OTHER PUBLICATIONS

Extended European Search Report on the European Patent Application No. 22211172.6 issued by the European Patent Office on Apr. 17, 2023.

(Continued)

*Primary Examiner* — Kenneth J Douyette
(74) *Attorney, Agent, or Firm* — IP & T GROUP LLP

(57) ABSTRACT

Proposed are a connector assembly and a battery module. The connector assembly may include a connector formed so that an external connector is inserted therein through a connector insertion portion formed in a casing, and a cover part coupled to the connector while surrounding an outer peripheral surface of the connector so as to seal a gap between the connector and the connector insertion portion. Accordingly, it is possible to block or delay discharge of a flame through the connector insertion portion of the battery module.

12 Claims, 6 Drawing Sheets

(56) References Cited

U.S. PATENT DOCUMENTS

| | | |
|---|---|---|
| 2019/0123318 A1 | 4/2019 | Fees et al. |
| 2021/0320371 A1 | 10/2021 | Dunn et al. |

FOREIGN PATENT DOCUMENTS

| | | |
|---|---|---|
| JP | 2019091628 A | 6/2019 |
| KR | 20010000112 A | 1/2001 |
| KR | 10-2013-0062711 A | 6/2013 |
| KR | 20130122669 A | 11/2013 |
| KR | 10-2020-0008824 A | 1/2020 |
| KR | 20200102292 A | 8/2020 |
| KR | 20210009795 A | 1/2021 |
| KR | 10-2021-0112645 A | 9/2021 |

OTHER PUBLICATIONS

Office Action for the Korean Patent Application No. 10-2021-0172179 issued by the Korean Patent Office on Aug. 8, 2023.

* cited by examiner

23: 23a, 23b
40: 41,42,43,44

CONNECTOR ASSEMBLY AND BATTERY MODULE

CROSS REFERENCE TO RELATED APPLICATION

The present application claims priority to Korean Patent Application No. 10.2021-0172179, filed Dec. 3, 2021, the entire contents of which is incorporated herein for all purposes by this reference.

BACKGROUND OF THE INVENTION

Field of the Invention

The present disclosure relates to a connector assembly and a battery module.

Description of the Related Art

Recently, the demand for secondary batteries that can be repeatedly charged aid discharged has been increasing rapidly in light portable devices such as mobile phones, notebook computers, or cameras, electric vehicles (EVs) or hybrid vehicles, and energy storage systems (ESS).

The secondary batteries may be formed as a batten module in which a plurality of battery cells are accommodated in a casing. In the case of the batten module, there exists the possibility that thermal runaway occurs in the battery module due to various factors such as battery overcharging, resulting in discharge of a flame.

If thermal runaway occurs in any one battery module, the flame may be discharged through an assembly gap of the battery module. The discharged flame may cause thermal propagation that heats neighboring battery modules. This thermal propagation may cause safety hazards such as explosion of the battery modules.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent Application Publication No. 10-2021-0112645

SUMMARY OF THE INVENTION

Accordingly, the present disclosure has been made keeping in mind the above problems occurring in the related art, and an objective of the present disclosure is to provide a connector assembly for preventing a flame from being discharged from a connector of a battery module.

Another objective of the present disclosure is to provide a battery module in which a flame is prevented from being discharged from a connector when thermal runaway occurs.

In order to achieve the above objectives, according to one aspect of the present disclosure, there is provided a connector assembly including: a connector formed so that an external connector is inserted therein through a connector insertion portion formed in a casing; and a cover part coupled to the connector while surrounding an outer peripheral surface of the connector, and configured to seal a gap between the connector and the connector insertion portion.

Furthermore, the connector may include: a connector body into which the external connector is inserted; and a connector pin connected to the connector body.

Furthermore, the connector assembly may further include a molding pan configured to seal a space between the connector body and the connector pin by molding.

Furthermore, the cover part may include at least one rib having an outer peripheral surface with a shape conforming to the connector insertion portion, and protruding from an outer peripheral surface thereof at a predetermined interval.

Furthermore, the rib may be formed in a shape conforming to a rib groove formed near the connector insertion portion of the casing at a position corresponding to the rib groove so as to be accommodated in the rib groove.

Furthermore, the rib may be formed in the shape conforming to the rib groove formed near the connector insertion portion of the casing at the position corresponding to the rib groove so as to be accommodated in the rib groove, and the rib may have a portion protruding vertically upward from the outer peripheral surface of the cover part in a shape conforming the connector insertion portion having at least a side bent and extended vertically upward.

Furthermore, the cover part may be made of a material including a silicone or a rubber material, and the molding part may be made of a material including an epoxy material, wherein the cover part and the molding part may be made of a high heat-resistant material which undergoes a volume change of equal to or less than 25% when exposed to a temperature of equal to or higher than 200° C. for 72 hours.

According to another aspect of the present disclosure, there is provided a battery module including: a battery assembly including a plurality of battery cells; a busbar assembly including an inner terminal connected to the battery assembly and configured to transmit power; a casing accommodating the battery assembly and the busbar assembly therein, and having a connector insertion portion into which an external connector is inserted; and a connector assembly configured to be electrically connectable to the external connector in the connector insertion portion.

Furthermore, the connector assembly may include: a connector formed so that the external connector is inserted therein through the connector insertion portion formed in the casing; and a cover part coupled to the connector while surrounding an outer peripheral surface of the connector, and configured to seal a gap between the connector and the connector insertion portion.

Furthermore, the connector may include: a connector body into which the external connector is inserted and a connector pin connected to the connector body.

Furthermore, the connector assembly may further include a molding part configured to seal a space between the connector body and the connector pin by molding.

Furthermore, the cover part may include at least one rib having an outer peripheral surface with a shape conforming to the connector insertion portion, and protruding from an outer peripheral surface thereof at a predetermined interval.

Furthermore, the casing may include at least one rib groove formed near the connector insertion portion, and the rib may be formed in a shape conforming to the rib groove so as to be accommodated in the rib groove.

Furthermore, the connector insertion portion may have at least a side bent and extended vertically upward, and the rib may be formed in the shape conforming to the rib groove formed near the connector insertion portion of the casing at a position corresponding to the rib groove so as to be accommodated in the rib groove, wherein the rib may have a portion protruding vertically upward from the outer peripheral surface of the cover part in a shape conforming to the connector insertion portion having at least a side bent and extended vertically upward.

Furthermore, the cover part may be made of a material including a silicone or a rubber material, and the molding part may be made of a material including an epoxy material, wherein the cover part and the molding part may be made of a high heat-resistant material which undergoes a volume change of equal to or less than 25% when exposed to a temperature of equal to or higher than 200° C. for 72 hours.

Furthermore, the busbar assembly may further include: a tab bus into which a plurality of cell tabs having the same polarity are inserted, and configured to electrically connect the inserted cell tabs to each other, and a busbar insulating member male of an electrically insulating material and configured to support and fix the inner terminal and the tab bus, and the insulating member may include a first partition wall protruding in a space between the tab bus and a neighboring tab bus and configured to vertically partition the tab bus and the neighboring tab bus from each other.

Furthermore, the insulating member may further include a second partition wall horizontally protruding from a lower portion of the first partition wall.

Furthermore, the battery module may further include an insulating part made of an electrically insulating material, wherein the casing may include a front cover coupled at a longitudinal first side of the battery assembly, and the first partition wall and the second partition un wall may protrude so as to be in close contact with the insulating part.

Furthermore, the casing may include a top cover coupled at an upper side of the battery assembly so as to cover the battery assembly, and the top cover may include at least one venting hole configured to allow gas or a flame generated inside the battery assembly to be vented to outside from an upper portion of the casing through the venting hole.

Furthermore, the top cover may further include a venting sheet coupled to a lower portion thereof so as to cover a lower portion of the venting hole, and the venting sheet may include a venting line formed at a portion thereof corresponding to the venting hole, and configured such that the portion corresponding to the venting hole is ruptured when a pressure of the gas generated inside the battery assembly reaches a predetermined pressure.

The features and advantages of the present disclosure will be more dearly understood from the following detailed description when taken in conjunction with the accompanying drawings.

All terms or words used in the specification and claims have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the embodiment of the present disclosure, when a flame occurs inside the battery module, it is possible to block or delay discharge of the flame through the connector insertion portion.

In addition, it is possible to block the flame from being discharged through the gap between the connector and the cover part because of a rib structure.

In addition, it is possible to block the connector from being directly exposed to the flame and thus being burned, thereby preventing loss of control ability for the battery module in which the flame occurred.

According to the embodiment of the present disclosure, it is possible to prevent the flame from being discharged through the connector insertion portion of the battery module, thereby improving safety of the battery module.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
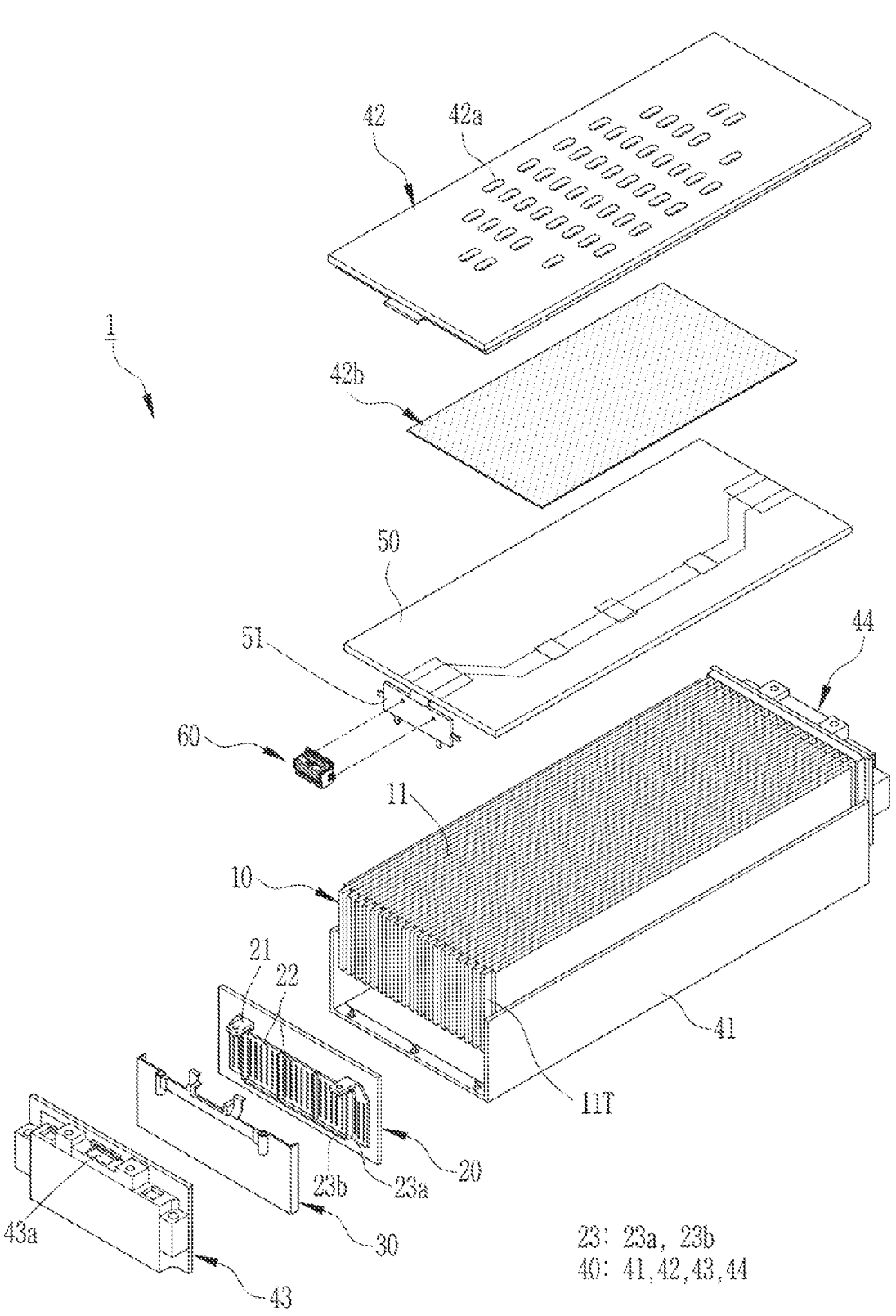
FIG. 1 is an exploded perspective view illustrating a connector assembly and a battery module according to an embodiment of the present disclosure.

The objectives, specific advantages, and novel features of an a exemplary embodiment of the present disclosure will be more dearly understood from the following detailed description and preferable embodiments when taken in conjunction with the accompanying drawings. As for reference numerals associated with parts in the drawings, the same reference numerals will refer to the same or like parts throughout the drawings. Further, it will be understood that, although the terms "first surface", "second surface". "first", "second", etc. may be used only to distinguish one element from another element, these elements should not be limited by these terms. In the following description of the exemplary embodiment, details of well-known features and techniques may be omitted to avoid unnecessarily obscuring the present disclosure.

In addition, the terms indicating directions, such as up, down, left, right, X-axis, Y-axis, Z-axis, etc., are only for convenience of description, and it will be obvious to those skilled in the art that these terms may be expressed differently depending upon viewing positions of an observer, positions of an object, etc.

In addition, the terms used herein is for the purpose of describing particular embodiments only and is not intended to be limiting. The singular forms "a" "an", and "the" are intended to include the plural forms as well, unless the context dearly indicates otherwise.

Hereinbelow, an exemplary embodiment of the present disclosure will be described in detail with reference to the accompanying drawings.

Figure 2:
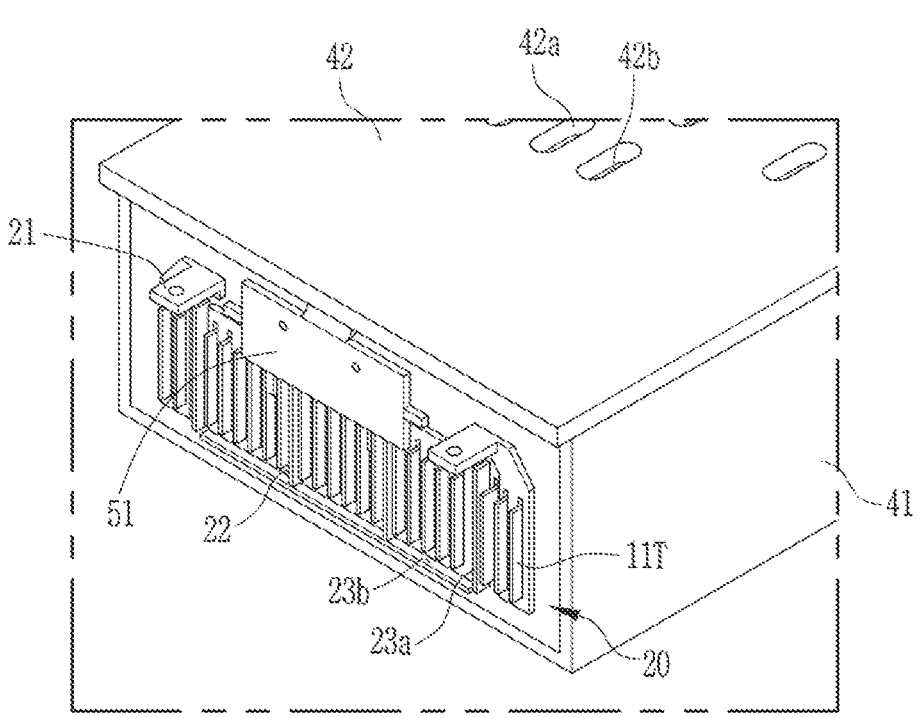
FIG. 2 is a partially enlarged view illustrating a bulbar assembly in a state in which a cell tab is inserted.
Figure 3:
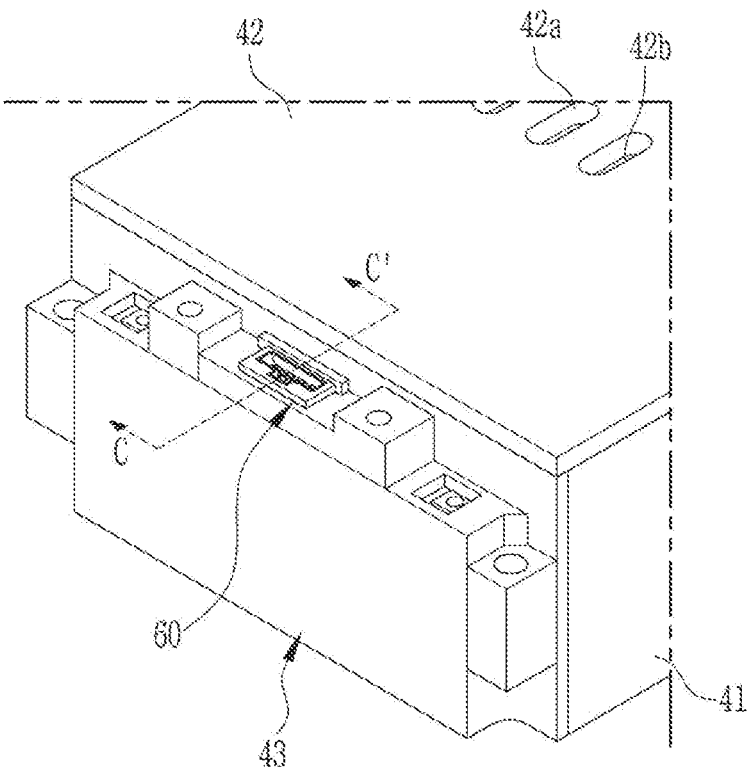
FIG. 3 is a partially enlarged view illustrating the battery module according to the embodiment of the present disclosure.
Figure 4:
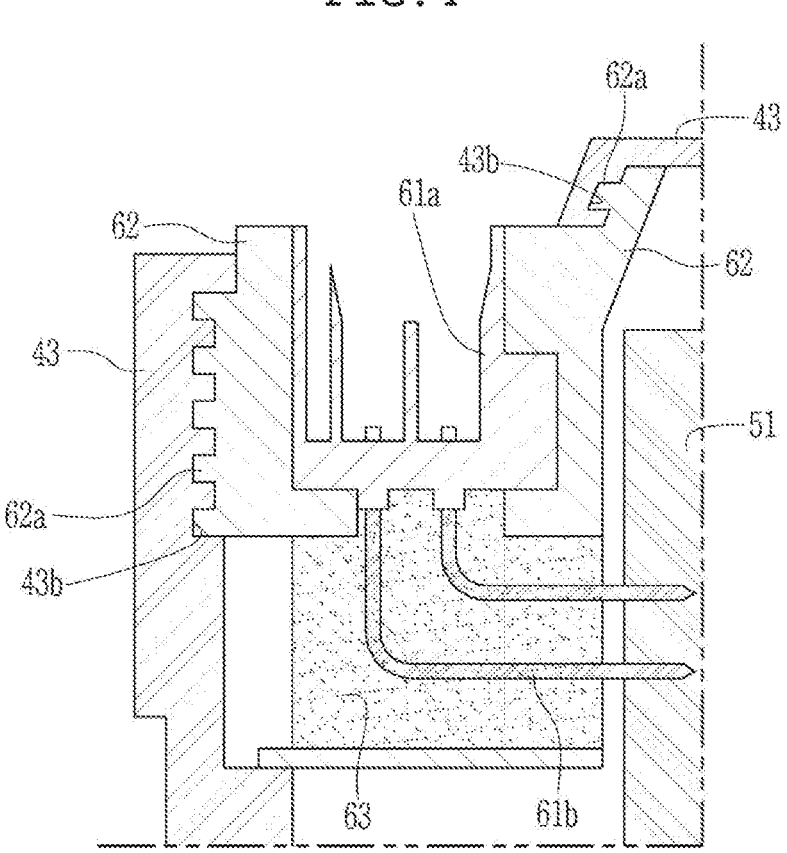
FIG. 4 is a sectional view taken along line C-C' of FIG. 3.

FIG. 1 is an exploded perspective view illustrating a connector assembly 60 and a battery module 1 according to an embodiment of the present disclosure. FIG. 2 is a partially enlarged view illustrating a busbar assembly 20 in a state in which a cell tab is inserted. FIG. 3 is a partially enlarged view illustrating the battery module 1 according to the embodiment of the present disclosure. FIG. 4 is a sectional view taken along line C-C of FIG. 3. Reference is made to FIGS. 1 to 4.

As illustrated in FIG. 1, the battery module 1 according to the embodiment of the present disclosure may include a battery assembly 10 including a plurality of battery cells 11, a casing 40 accommodating the battery assembly 10 therein and having a connector insertion portion 43a into which an external connector is inserted, and the connector assembly 60 electrically connectable to the external connector in the connector insertion portion 43a.

The battery assembly 10 may include the plurality of battery cells 11. The plurality of battery cells 11 may be arranged in a stacked structure to form the battery assembly 10. The battery assembly 10 may be electrically connected to the busbar assembly 20 through a cell tab 11T exposed to the outside of each of the plurality of battery cells 11.

The busbar assembly 20 includes an inner terminal 21 electrically connectable to an external electrode, a tab bus 22 into which a plurality of cell tabs 11T having the same polarity are inserted and electrically connecting the inserted cell tabs 11T to each other, and a busbar insulating member 23 made of an electrically insulating material and preventing the inner terminal 21 and the tab bus 22 from being short-circuited with other members.

The inner terminal 21 may electrically connect the battery assembly 10 and the a external electrode to each other. Specifically, the external electrode may be electrically connected to the busbar assembly 20 through the inner terminal 21, and the busbar assembly 20 may be electrically connected to the battery assembly 20. As a result, the battery assembly 10 may be electrically connected to the external electrode.

The tab bus 22 may be coupled to the busbar insulating member 23 which will be described later, and may be electrically connected to the plurality of cell tabs 11T having the same polarity. In addition, the tab bus 22 may have an insertion portion. A plurality of neighboring cell tabs 11T having the same polarity may be inserted into the insertion portion, so that the inserted cell tabs 11T may be electrically connected to each other.

The busbar insulating member 23 may support and fix the inner terminal 21 and the tab bus 22 so that the inner terminal 21 and the tab bus 22 are disposed at a predetermined position inside the battery module 1. In addition, the busbar insulating member 23 may be of an electrically insulating material, and may prevent the inner terminal 21 and the tab bus 22 from being brought into contact with the casing 40, etc. and thus short-circuited.

In addition, the busbar insulating member 23 may include a first partition wall 23a protruding in the space between the tab bus 22 and a neighboring tab bus 22 and vertically partitioning the tab bus 22 and the neighboring tab bus 22 from each other, and a second partition wall 23b horizontally protruding from a lower portion of the first partition wall 23a. The first partition wall 23a and the second partition wall 23b may prevent, when a fire occurs in the battery cells 11, the cell tab 11T or the tab bus 22 from being brought into contact with a neighboring cell tab 11T having a different polarity from the cell tab 11T or a neighboring tab bus 22 and thus short-circuited. Also, when various fragments are generated internally due to a fire, a short circuit may be prevented from occurring due to such fragments scattering to the neighboring tab bus 22, the casing 40, etc.

In addition, as illustrated in FIG. 2, the first partition wall 23a and the second partition wall 23b may further protrude from the busbar assembly 20 so as to be in close contact with an insulating part 30. In this case, gas or a flame generated in the battery cells 11 may be guided to flow to an upper portion of the tab bus 22.

Specifically, when the gas or the flame generated in the battery cells 11 flows through the insertion portion of the tab bus 22, the first partition wall 23a may prevent the venting gas or the flame from flowing toward left and right neighboring tab buses 22. In addition, the second partition wall 23b positioned trader the first partition wall 23a may prevent the gas or the flame from flowing toward a lower portion of the tab bus 22. Consequently, the first partition wall 23a and the second partition wall 23b may block the spaces on left, right, and lower sides of each tab bus 22 and guide the gas or the flame to flow toward the upper portion of the tab bus 22. The gas or the flame thus guided upward may be discharged to the outside of the battery module 1 through a venting hole 42a by rupturing a venting sheet 42b which will be described later.

In other words, the first partition wall 23a and the second partition wall 23b may not only prevent an internal short-circuit when a fire occurs inside the battery module 1, but also appropriately control the flow direction of the gas or the flame generated inside the battery module 1 to be guided in the direction of the venting hole 42a of a top cover 42.

The casing 40 may accommodates the battery assembly 10 and the busbar assembly 20 therein, and may have the connector insertion portion 43a into which the external connector is inserted. Specifically, the casing 40 may include a bottom cover 41 formed in a "C" shape and providing a space in which the battery assembly 10 is seated a front cover 43 coupled to the bottom cover 41 at a longitudinal first side of the battery assembly 10, a back cover 44 coupled to the bottom cover 41 at a longitudinal second side of the battery assembly 10, and the top cover 42 coupled to the bottom cover 41 at an upper side of the battery assembly 10 so as to cover the battery assembly 10. A rib groove 43b in which a rib 62a of a cover part 62 which will be described later is accommodated may be formed in the casing 40.

In addition, the casing 40 may be made of a metal material such as aluminum (Al) to improve the mechanical rigidity of the battery module 1. In this case, the front cover 43 made of the metal material may have electrical conductivity. To prevent a short circuit between the electrically conductive front cover 43 and the busbar assembly 20, the insulating part 30 made of an electrically insulating material may be disposed between the front cover 43 and the busbar assembly 20.

As illustrated in the drawings, the top cover 42 may further include at least one venting hole 42a formed in a predetermined arrangement, and the venting sheet 42b coupled to a lower surface thereof.

The venting hole 42a may be formed by perforating a portion of the top cover 42 in a thickness direction. The venting hole 42a is a path through which the venting gas or the flame generated inside the batten module is discharged to the outside of the battery module 1. In addition, a venting direction may be appropriately controlled in the battery module 1 by modifying the shape of the venting hole 42a or the arrangement structure of a plurality of venting holes 42a.

Specifically, when the plurality of venting holes 42a are intensively arranged at one side of the battery module 1, the gas generated inside the battery module may be vented to only the one side of the battery module 1. By varying the arrangement structure and arrangement of the venting holes 42a in this way, it is possible to appropriately control the venting direction in the battery module 1. In addition, each of the venting holes 42a may be formed in the top cover 42 at a position corresponding to each associated one of the battery cells 11 so that the gas generated from the battery cell 11 is directly discharged.

The venting sheet 42b may be coupled to a lower portion of the top cover 42 and delay the venting of the venting gas or flame inside the battery module 1 to the venting holes 42a located thereabove. In other words, the venting sheet 42b may be coupled to the lower portion of the top cover 42 so as to cover a lower portion of the venting holes 42a.

When a pressure inside the battery module 1 further increases, a portion of the venting sheet 42b corresponding to each of the venting holes 42a may be eventually ruptured. When the venting sheet 42b is ruptured, the gas or flame inside the battery module 1 may be discharged to the outside of the battery module 1 through the venting holes 42a.

Specifically, although not illustrated in the drawings, the venting sheet 42b may further include a venting line formed by cutting a portion of the venting sheet 42b in a thickness direction at a position corresponding to each of the venting holes 42a The venting line may be ruptured when a pressure of the gas generated inside the battery assembly 10 reaches a predetermined pressure in the casing 40, thereby allowing the gas to be discharged from an upper portion of the casing 40 through the venting holes 42a of the top cover 42. The shape of the venting line may vary, such as an "I" shape, a zigzag shape, etc. The timing at which the venting gas or the flame is vented or an endurable pressure in the battery module 1 may be appropriately controlled by variously modifying the shape or cutting thickness of the venting line.

In addition, a circuit board 50 controlling the battery assembly 10 may be further provided between the top cover 42 and the battery assembly 10. The circuit board 50 may be provided with a sensing unit to measure the voltage, current, or temperature of the battery assembly 10, or to acquire information for determining whether overcharging occurs in real time. A connector coupling portion 51 to which the connector 61 is coupled may be formed at a side of the circuit board 50. The circuit board 50 may transmit and receive information to and from the outside in real time through the connector coupling portion 51 to which the connector 61 is coupled.

In addition, as illustrated in the drawings, the connector insertion portion 43a into which the external connector is inserted may be formed in the casing 40. The connector insertion portion 43a may be formed in a surface of the casing 40 at a position near the connector coupling portion 51 so that the external connector and the connector 61 are coupled to each other. In other words, the connector insertion portion 43a may be formed by perforating the surface of the casing 40 at a position corresponding to the connector 61.

Meanwhile, in the drawings, the connector insertion portion 43a is illustrated as being formed in the front cover 43, but the position of the connector insertion portion 43a is not limited thereto. Specifically, the position of the connector insertion portion 43a may be configured to correspond to the position where the connector 61 is coupled. For example, when the connector 61 is positioned near the top cover 42, the connector insertion portion 43a may also be formed in the top cover 42 at a position corresponding to the connector 61.

The connector 61 may be exposed to the outside of the casing 40 through the connector insertion portion 43a The external connector may be inserted into a connector body 61a exposed through the connector insertion portion 43a and may be connected to the connector 61.

Meanwhile, when the connector 61 is exposed through the connector insertion portion 43a due to an assembly tolerance of the battery module 1, a gap may be formed between the connector insertion portion 43a and the connector 61. In this case, when a fire occurs due to thermal runaway or the like inside the battery module 1, a flame may be discharged through the gap between the connector 61 and the connector insertion portion 43a The discharged flame may apply a heat load to another neighboring batten module 1, causing thermal propagation. This may result in deterioration of safety of the battery module 1.

Therefore, in order to prevent the flame from being discharged through the gap between the connector 61 and the connector insertion portion 43a, the cover part 62 coupled to the connector 61 while surrounding an outer peripheral surface of the connector 61 so as to seal the gap between the connector 61 and the connector insertion portion 43a may be provided. The cover part 62 may be coupled to the connector 61 to form the connector assembly 60.

Figure 5:
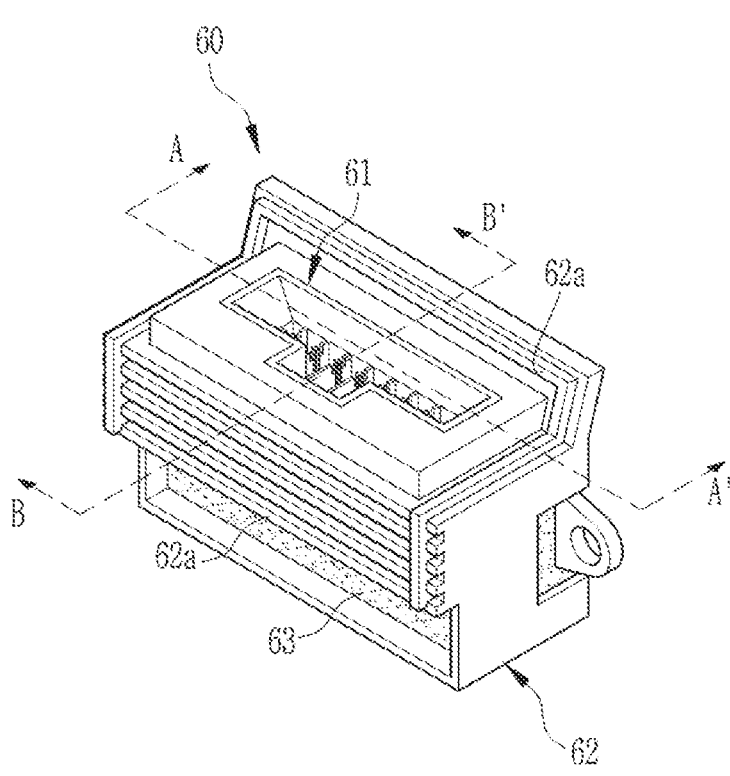
FIG. 5 is a perspective view illustrating the connector assembly according to the embodiment of the present disclosure.
Figure 6:
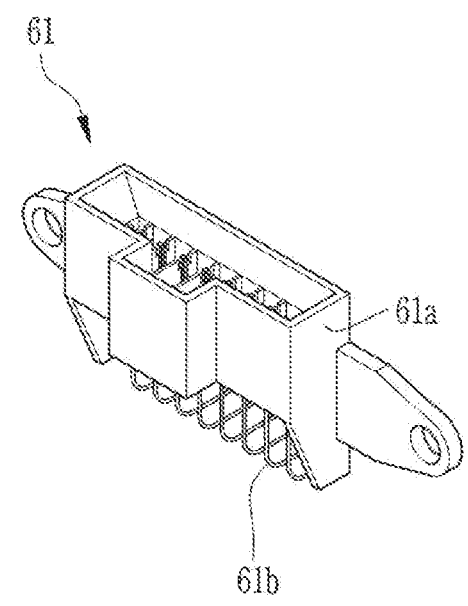
FIG. 6 is a perspective view illustrating a connector.
Figure 7:
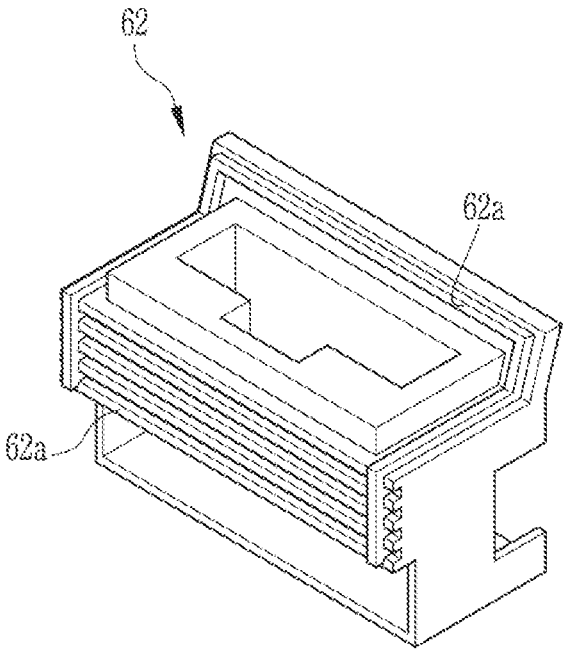
FIG. 7 is a perspective illustrating a cover part.
Figure 8:
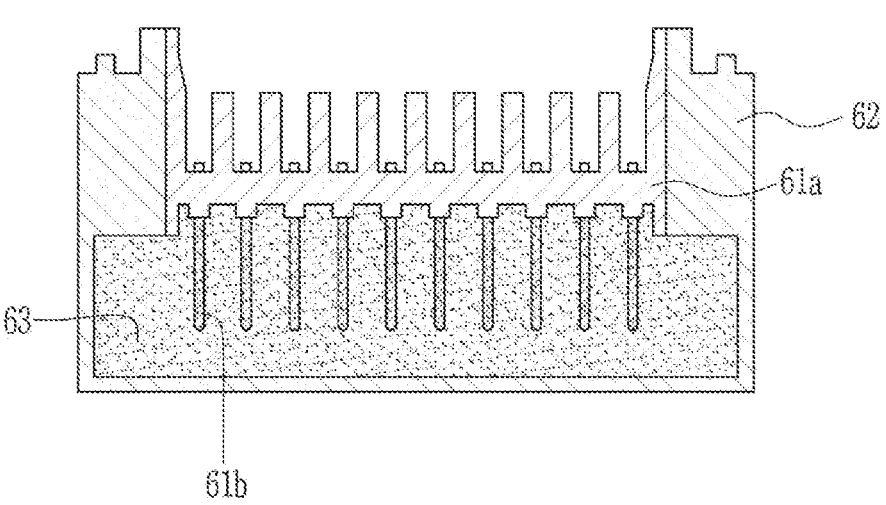
FIG. 8 is a sectional view taken along line A-A' of FIG. 5.
Figure 9:
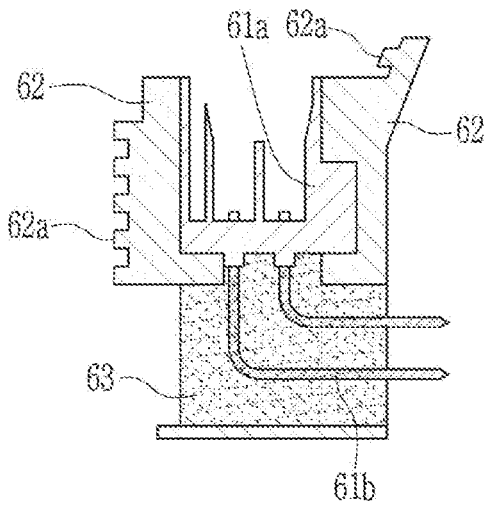
FIG. 9 is a sectional view taken along line B-B' of FIG. 5.

FIG. 5 is a perspective view illustrating the connector assembly 60 according to the embodiment of the present disclosure. FIG. 6 is a perspective view illustrating the connector 61. FIG. 7 is a perspective illustrating a cover part 62. FIG. 8 is a sectional view taken along line A-A' of FIG. 5. FIG. 9 is a sectional view taken along line B-B' of FIG. 5. Reference is made to FIGS. 5 to 9.

The connector assembly 60 according to the embodiment of the present disclosure may include the connector 61 formed so that the external connector is inserted therein through the connector insertion portion 43a formed in the casing 40, and the cover part 62 coupled to the connector 61 while surrounding the outer peripheral surface of the connector 61 so as to seal a gap between the connector 61 and the connector insertion portion 43a The connector assembly 60 may seal the gap between the connector 61 and the connector insertion portion 43a, so that when a fire occurs inside the battery module 1, a flame may be prevented from being discharged through the gap between the connector 61 and the connector insertion portion 43a.

The connector 61 may induce the connector body 61a into which the external connector is inserted and the connector pin 61b connected to the connector body 61a The connector 61 may be connected to the external connector through the connector insertion portion 43a, and may transmit and receive data to and from the outside in real time.

The connector body 61a may provide a space in which the external connector is stably inserted and seated. A fastening portion may be formed at each of opposite sides of the connector body 61a The connector 61 may be coupled to the connector coupling portion 51 of the circuit board 50 through the respective fastening portions formed at the connector body 61a.

In addition, the connector pin 61b may have a first side connected to the connector body 61a and a second side connected to the connector coupling portion 51. Specifically, the first side of the connector pin 61b may be inserted into the connector body 61a in a direction opposite to the direction in which the external connector is inserted into the connector 61. The connector pin 61b may be formed in a shape exposed from the connector body 61a, except for a portion thereof inserted into the connector body 61a.

The cover part 62 may be coupled to the connector 61 while surrounding the outer peripheral surface of the connector 61, and may seal the gap between the connector 61 and the connector insertion portion 43a In other words, the cover part 62 may fill the gap between the connector 61 and the connector insertion portion 43*a*, thereby blocking the flame generated inside the battery module 1 from being discharged to the outside through the gap.

In addition, the cover part 62 may surround the outer peripheral surface of the connector 61, and an inner peripheral surface of the cover part 62 may be formed in a shape conforming to the outer peripheral surface of the connector 61. For example, when irregularities are formed on the outer peripheral surface of the connector 61, irregularities corresponding to the irregularities may be formed on the inner peripheral surface of the cover part 62. The irregularities formed on the outer peripheral surface of the connector 61 and the irregularities formed on the inner peripheral surface of the cover part 62 may be alternately engaged with each other, so that a sealing force between the connector 61 and the cover part 62 may be improved. As a result, it is possible to prevent the cover part 62 from being detached from the connector 61 by the pressure inside the battery module 1.

More preferably, the connector 61 and the cover part 62 may be formed by insert injection molding. The connector 61 and the cover part 62 may be integrally coupled to each other, so that a gap between the connector 61 and the cover part 62 may be eliminated.

In addition, in order to form a molding part 63 which will be described later by filling the space between the connector body 61*a* and the connector pin 61*b* with potting compounds, the cover part 62 may surround the connector 61 so that an area filled with the potting compounds is exposed.

In addition, the cover part 62 may include at least one rib 62*a* having an outer peripheral surface with a shape conforming to the connector insertion portion 43*a*, and protruding from an outer peripheral surface thereof at a predetermined interval.

In other words, the outer peripheral surface of the cover part 62 may be formed in a shape conforming to the periphery of the connector insertion portion 43*a* so as to make contact with the surface of the casing 40 in which the connector insertion portion 43*a* is formed.

More specifically, the outer peripheral surface of the cover part 62 may be in close contact with the casing 40 having the connector insertion portion 43*a* therein so as to seal the gap between the connector 61 and the connector insertion portion 43*a*. For example, when irregularities are formed on the surface of the casing 40 in which the connector insertion portion 43*a* is formed, the surface being in contact with the outer peripheral surface of the cover part 62 toward the cover part 62, irregularities corresponding to the irregularities may be formed on the cover part 62. The irregularities of the cover part 62 and the irregularities of the casing 40 may be alternately engaged with each other, so that a contact area between the cover part 62 and the casing 40 may be increased. As a result, a flame blocking ability of the connector assembly 60 may be improved.

In addition, the connector insertion portion 43*a* may be formed in a shape in which the periphery is vertically bent upward. In this case, the outer peripheral surface of the cover part 62 may also be formed in a shape in which a side thereof is bent vertically so as to conform to the periphery of the connector insertion portion 43*a*, so that the cover part 62 may be in close contact with the casing 40 having connector insertion portion 43*a* therein.

In other words, the inner peripheral surface of the cover part 62 may be formed in a shape conforming to the outer peripheral surface of the connector 61, so that the cover part 62 may seal the gap between the cover part 62 and the connector 61. Furthermore, the outer peripheral surface of the cover part 62 may be formed in a shape conforming to the connector insertion portion 43*a*, so that the cover part 62 may seal a gap between the cover part 62 and the connector insertion portion 43*a* As a result, the cover part 62 may be fitted between the connector 61 and the connector insertion portion 43*a* without a gap.

In addition, the cover part 62 may be made of a high heat-resistant material which undergoes a volume change of equal or less than 25% at a temperature of equal to or higher than 200° C. so as not to be deformed by heat. More preferably, the cover part 62 may be made of a high heat-resistant material which undergoes a volume change of equal to or less than 25% when exposed to a temperature in the range of 250° C. to 350° C. for 72 hours. Here, the volume change may include both a case where the cover part 62 thermally expands under exposure to heat and a case where it thermally contracts under exposure to heat.

Specifically, when the later volume of the cover part 62 becomes larger than the initial volume of the cover part 62, the connector 61 may be subjected to pressure by the expansion of the cover part 62 and thus be broken, generating a gap between the connector 61 and the connector insertion portion 43*a*. Also, even when the later volume of the cover part 62 becomes smaller than the initial volume of the cover part 62, a gap may be generated between the connector 61 and the connector insertion portion 43*a*.

In the case of the connector assembly 60 in which the cover part 62 is made of the high heat-resistant material as described above, when exposed to high temperatures, the cover part 62 may be deformed to prevent the flame from being discharged through the gap between the cover part 62 and the connector insertion portion 43*a* In addition, the cover part 62 may be made of a material having elasticity so as to improve a sealing ability. Specifically, the cover part 62 may be made of a material including a silicone or a rubber material, and alternatively, the cover part 62 may be made of a silicone rubber.

In addition, the cover part 62 may include at least one rib 62*a* protruding from the outer peripheral surface thereof at a predetermined interval. The rib 62*a* protruding from the outer peripheral surface of the cover part 62 may increase a contact area between the casing 40 and the cover pan 62 near the connector insertion portion 43*a*, thereby improving the flame blocking ability of the connector assembly 60.

In addition, the rib 62*a* may be formed in various shapes. For example, time rib 62*a* may be formed to protrude from the outer peripheral surface of the cover part 62 in parallel to the connector insertion portion 43*a*.

More specifically, the rib 62*a* may protrude along the periphery of the outer peripheral surface of the cover part 62 so that the surface of the casing 40 in which the connector insertion portion 43*a* is formed and the rib 62*a* are parallel to each other. In other words, the rib 62*a* may protrude along the outer peripheral surface of the cover part 62 so as to be orthogonal to a direction in which the casing 40 is perforated to form the connector insertion portion 43*a*.

The rib 62*a* protruding from the outer peripheral surface of the cover part 62 may increase a surface area of the outer peripheral surface of the cover part 62. As a result, a contact area between the casing 40 having the connector insertion portion 43*a* therein and the outer peripheral surface of the cover part 62 may be increased, thereby further improving the flame blocking ability of the connector assembly 60.

In addition, the rib 62*a* may be formed in a shape conforming to the rib groove 43*b* which will be described later and accommodated in the rib groove 43*b*. Specifically, the rib 62*a* may be formed in a shape conforming to the rib groove 43b formed near the connector insertion portion 43a of the casing 40 at a position corresponding to the rib groove 43b so as to be accommodated in the rib groove 43b, and the rib 62a may have a portion protruding vertically upward from the outer peripheral surface of the cover part 62 in a shape conforming to the connector insertion portion 43a having at least a side bent and extended vertically upward.

The rib 62a may allow the cover part 62 to cope with various shapes of the connector insertion portion 43a, and as a result, the flame blocking ability of the connector assembly 60 may be further improved.

In addition, a plurality of ribs 62a may be formed to protrude from the outer peripheral surface of the cover part 62. The plurality of ribs 62a may protrude from the outer peripheral surface of the cover part 62 at a predetermined interval. Each of the plurality of ribs 62a may be accommodated in the rib groove 43b of the casing 40 which will be described later.

In addition, the ribs 62a may protrude from the outer peripheral surface of the cover part 62 at a position near a lower portion of the connector insertion portion 43a of the cover part 62. Specifically, the outer peripheral surface of the cover part 62 may be in vertical contact with the casing 40 having the connector insertion portion 43a therein, while the ribs 62a formed on the cover part 62 may be in vertical contact with a lower portion of the casing 40.

In other words, as illustrated in FIG. 4, the ribs 62a protruding from a lower portion of the cover part 62 and the outer peripheral surface of the cover part 62 may be arranged in an "L" shape with respect to the connector insertion portion 43a With this structure, the ribs 62a may prevent the flame from being directly discharged through the gap between the cover part 62 and the connector insertion portion 43a, and increase a contact area thereof with the connector insertion portion 43a.

In addition, each of the ribs 62a may be formed in a shape conforming to the rib groove 43b formed near the connector insertion portion 43a of the casing 40 at a position corresponding to the rib groove 43b so as to be accommodated in the rib groove 43b.

More specifically, the rib groove 43b may be formed in a shape concavely recessed inside the casing 40 to conform to the rib 62a Furthermore, the rib groove 43b may be formed inside the casing 40 at a position near the connector insertion portion 43a so as to correspond to the rib 62a formed on the cover part 62, and may be formed to be long parallel to the periphery of the cover part 62 so as to accommodate the rib 62a of the cover part 62.

In this case, the rib groove 43b in which the rib 62a is accommodated may be configured such that an uneven section or a carved section in which the rib 62a of the cover part 62 and the rib groove 43b of the casing 40 are alternately repeated is formed in a space where an inner surface of the casing 40 and an outer surface of the cover part 62 are in contact with each other. These sections may increase a contact area between the cover part 62 and the connector insertion portion 43a, thereby improving the flame blocking ability of the connector assembly 60.

In addition, a plurality of rib grooves 43b may be formed. In this case, the plurality of ribs 62a formed on the cover part 62 may be accommodated in the plurality of rib grooves 43b, respectively.

In addition, the connector assembly 60 according to the embodiment of the present disclosure may further include the molding part 63 sealing the space between the connector body 61a and the connector pin 61b. The molding part 63 may be formed by molding the connector pin 61b exposed from the connector body 61a with potting compounds together with the space in which the connector pin 61b is formed.

More specifically, the cover part 62 may be formed to surround the connector pin 61b. However, since the connector pin 61b is a configuration connected to the connector coupling portion 51 of the circuit board 50, the cover part 62 may be formed to surround the connector pin 61b except for a portion where the corrector pin 61b is connected to the connector coupling portion 51. In this case, the molding part 63 may seal the space between the cover pan 62 and the connector pin 61b or the space between the connector pin 61b and the connector body 61a thereby blocking the flame from flowing through these spaces not covered by the cover part 62.

In addition, the molding part 63 may be made of a high heat-resistant material which undergoes a volume change of equal or less than 25% at a temperature of equal to or higher than 200° C. so as not to be deformed by heat. More preferably, the molding part 63 may be made of a high heat-resistant material which undergoes a volume change of equal to or less than 25% when exposed to a temperature in the range of 250° C. to 350° C. for 72 hours. Here, the volume change may include both a case where the molding part 63 thermally expands under exposure to heat and a case where it thermally contracts under exposure to heat.

When made of the high heat-resistant material having the above properties, the molding part 63 may maintain an initially designed shape thereof as much as possible even when exposed to high temperatures. As a result, the molding part 63 may delay the sealing of the space between the connector body 61a and the connector pin 61b as much as possible even under a high-temperature environment.

In addition, the molding part 63 may be made of an epoxy-based material so as to improve sealing and adhesion properties with respect to the space between the connector body 61a and the connector pin 61b.

With such a configuration, the gas or the flame generated in the battery cells 11 may be blocked from flowing into the gap between the connector 61 and the connector insertion portion 43a by the connector assembly 60. The gas or the flame that is blocked from being vented into the gap between the connector 61 and the connector insertion portion 43a may be guided toward the top cover 42 to rupture the venting sheet 42b, and eventually be discharged from an upper portion of the battery module 1 through the venting holes 42a of the top cover 42.

While the exemplary embodiments of the present disclosure have been described above, the embodiments are only examples of the present disclosure, and it will be understood by those skilled in the art that the present disclosure can be modified or changed in various forms without departing from the technical spirit of the present disclosure.

Simple modifications or changes of the present disclosure belong to the scope of the present disclosure, and the detailed scope of the present disclosure will be more clearly understood by the accompanying claims.

What is claimed is:

1. A battery module comprising:
   a battery assembly comprising a plurality of battery cells;
   a busbar assembly comprising:
   an inner terminal connected to the battery assembly and configured to transmit power;
   a tab bus into which a plurality of cell tabs having the same polarity are inserted, and configured to electrically connect the inserted cell tabs to each other; and a busbar insulating member made of an electrically insulating material and configured to support and fix the inner terminal and the tab bus;

a casing accommodating the battery assembly and the busbar assembly therein, and having a connector insertion portion into which an external connector is inserted; and a connector assembly configured to be electrically connectable to the external connector in the connector insertion portion, wherein the busbar insulating member comprises a first partition wall protruding in a space between the tab bus and a neighboring tab bus and configured to vertically partition the tab bus and the neighboring tab bus from each other.

2. The battery module of claim 1, wherein the connector assembly comprises:

a connector formed so that the external connector is inserted therein through the connector insertion portion formed in the casing; and a cover part coupled to the connector while surrounding an outer peripheral surface of the connector, and configured to seal a gap between the connector and the connector insertion portion.

3. The battery module of claim 2, wherein the connector comprises:

a connector body into which the external connector is inserted; and a connector pin connected to the connector body.

4. The battery module of claim 3, wherein the connector assembly further comprises a molding part configured to seal a space between the connector body and the connector pin by molding.

5. The battery module of claim 4, wherein the cover part comprises at least one rib having an outer peripheral surface with a shape conforming to the connector insertion portion, and protruding from an outer peripheral surface thereof at a predetermined interval.

6. The battery module of claim 5, wherein the casing comprises at least one rib groove formed near the connector insertion portion, and the rib is formed in a shape conforming to the rib groove so as to be accommodated in the rib groove.

7. The battery module of claim 6, wherein the connector insertion portion has at least a side bent and extended vertically upward, and the rib is formed in the shape conforming to the rib groove formed near the connector insertion portion of the casing at a position corresponding to the rib groove so as to be accommodated in the rib groove, wherein the rib has a portion protruding vertically upward from the outer peripheral surface of the cover part in a shape conforming to the connector insertion portion having at least a side bent and extended vertically upward.

8. The battery module of claim 4, wherein the cover part is made of a material including a silicone or a rubber material, and the molding part is made of a material including an epoxy material, wherein the cover part and the molding part are made of a high heat-resistant material which undergoes a volume change of equal to or less than 25% when exposed to a temperature of equal to or higher than 200° C. for 72 hours.

9. The battery module of claim 1, wherein the busbar insulating member further comprises a second partition wall horizontally protruding from a lower portion of the first partition wall.

10. The battery module of claim 9, further comprising an insulating part made of an electrically insulating material, wherein the casing comprises a front cover coupled at a longitudinal first side of the battery assembly, and the first partition wall and the second partition wall protrude so as to be in close contact with the insulating part.

11. The battery module of claim 1, wherein the casing comprises a top cover coupled at an upper side of the battery assembly so as to cover the battery assembly, and the top cover comprises at least one venting hole configured to allow gas or a flame generated inside the battery assembly to be vented to outside from an upper portion of the casing through the venting hole.

12. The battery module of claim 11, wherein the top cover further comprises a venting sheet coupled to a lower portion thereof so as to cover a lower portion of the venting hole, and the venting sheet comprises a venting line formed at a portion thereof corresponding to the venting hole, and configured such that the portion corresponding to the venting hole is ruptured when a pressure of the gas generated inside the battery assembly reaches a predetermined pressure.

* * * * *